Aug. 14, 1945. O. H. SAMUELSON ET AL 2,382,028
CONTAINER BLOWING AND COOLING APPARATUS
Filed Oct. 1, 1942 3 Sheets-Sheet 1

INVENTOR.
OTTO H. SAMUELSON AND
ANTHONY T. ZAPPIA
By: Hood & Hahn.
ATTORNEYS

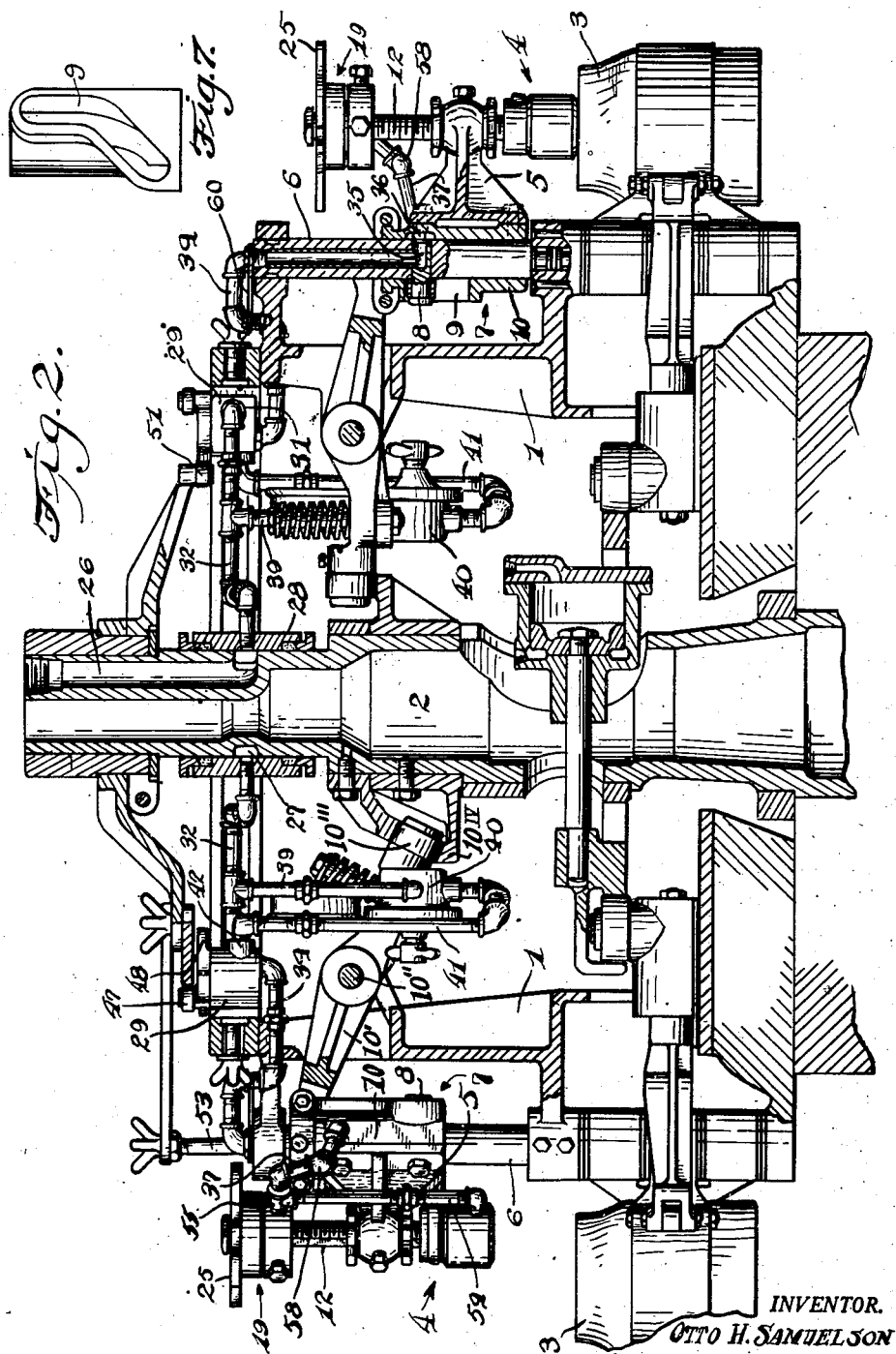

Aug. 14, 1945.   O. H. SAMUELSON ET AL   2,382,028
CONTAINER BLOWING AND COOLING APPARATUS
Filed Oct. 1, 1942   3 Sheets-Sheet 3
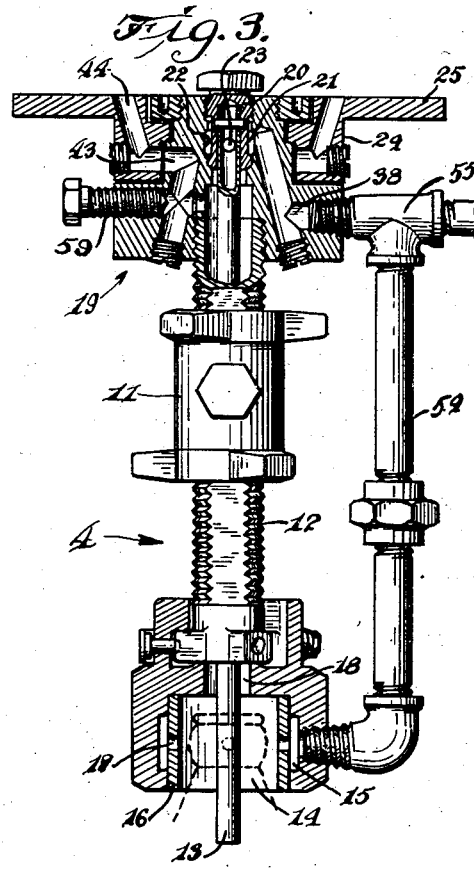
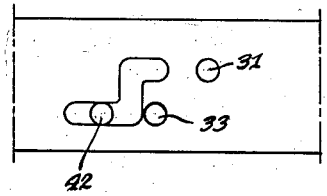
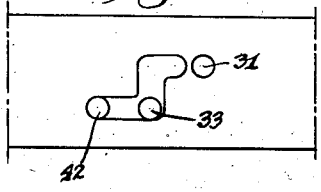
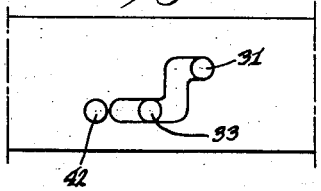
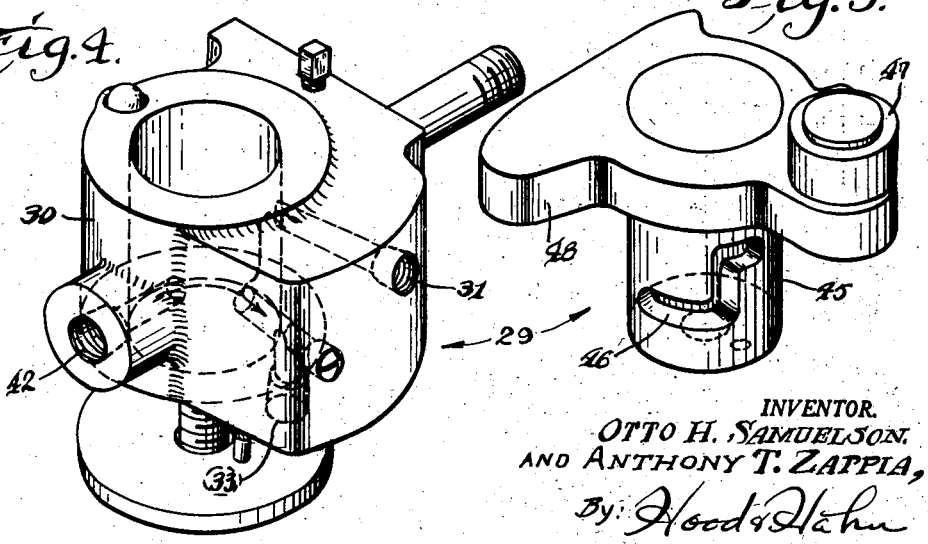
INVENTOR.
OTTO H. SAMUELSON.
AND ANTHONY T. ZAPPIA,
By: Hood & Hahn
ATTORNEYS Patented Aug. 14, 1945

2,382,028

UNITED STATES PATENT OFFICE 2,382,028

CONTAINER BLOWING AND COOLING APPARATUS

Otto H. Samuelson and Anthony T. Zappia, Indianapolis, Ind., assignors to S. & Z. Manufacturing Company, Inc., Indianapolis, Ind., a corporation of Indiana Application October 1, 1942, Serial No. 460,370

8 Claims. (Cl. 49—19)

Our present invention relates to improvements in container blowing machines and particularly to that class of machines for shaping and forming containers, particularly glass containers, by blowing methods wherein the molten glass is deposited in a suitable mold and a supply of air, or other suitable fluid, under pressure is admitted to the mold for the purpose of forcing the molten glass against the sides of the mold to shape the same and expanding the glass to make the container hollow.

In machines of this character, the blow head reciprocates relatively to the mold and, at the same time, has a rotary movement relative to the mold. In other words, the movement of the blow head is somewhat spiral in its vertical movement and, because of this fact, it has heretofore been necessary to conduct the air pressure to the blow head through the medium of flexible rubber hose connections.

Furthermore, by means of a process of blowing and cooling the glass container as described in our co-pending application Serial No. 450,538 filed July 11, 1942, which issued as Patent No. 2,363,999 on Nov. 28, 1944, the blowing air which is admitted to the mold under comparatively low pressure is exhausted from the mold and then a stream of cooling air is admitted under considerably higher pressure. This, of course, necessitates an apparatus having controlling valves, and it has been found that where such apparatus involves the use of rubber or other flexible hose, the hose deteriorates rapidly due to the temperature of the air exhausting from the mold. We have discovered that as a result of the extremely hot air passing out of the blow head for the purpose of cooling the interior of the container after the same has been shaped, the heat has a tendency to rapidly destroy any flexible hose which may be used. Heretofore such hose has been of rubber or rubber composition and, in fact, various types of flexible hose have been used but have been found unsatisfactory due to the extreme heat of the air which has to be handled.

It is one of the objects of the present invention to provide a structure wherein, while the control valve for controlling the admission of blowing pressure may be, and is, mounted upon the rotating frame and is thus relatively stationarily mounted, we are enabled to conduct the blowing pressure of air to the blow head without resorting to flexible hose connections and we are further enabled to provide a means for controlling the admission and emission of cooling air from the blow head by means of a valve arrangement which likewise dispenses with a flexible rubber, or like, hose.

For the purpose of disclosing the invention an embodiment thereof is disclosed in the accompanying drawings, in which Fig. 1 is a plan view of a rotary blowing apparatus, shown in this instance as having six blow molds and their associated blow heads;

Fig. 2 is a side elevation, certain parts being shown in section, of so much of the blowing apparatus as is necessary for the purpose of disclosing our invention;

Fig. 3 is a longitudinal sectional view of a blow head adapted for use in connection with our invention;

Fig. 4 is a perspective view of the valve casing controlling the admission of blowing and cooling pressure to the blow head;

Fig. 5 is a perspective view of the valve member cooperating with Fig. 4;

Figure 1:
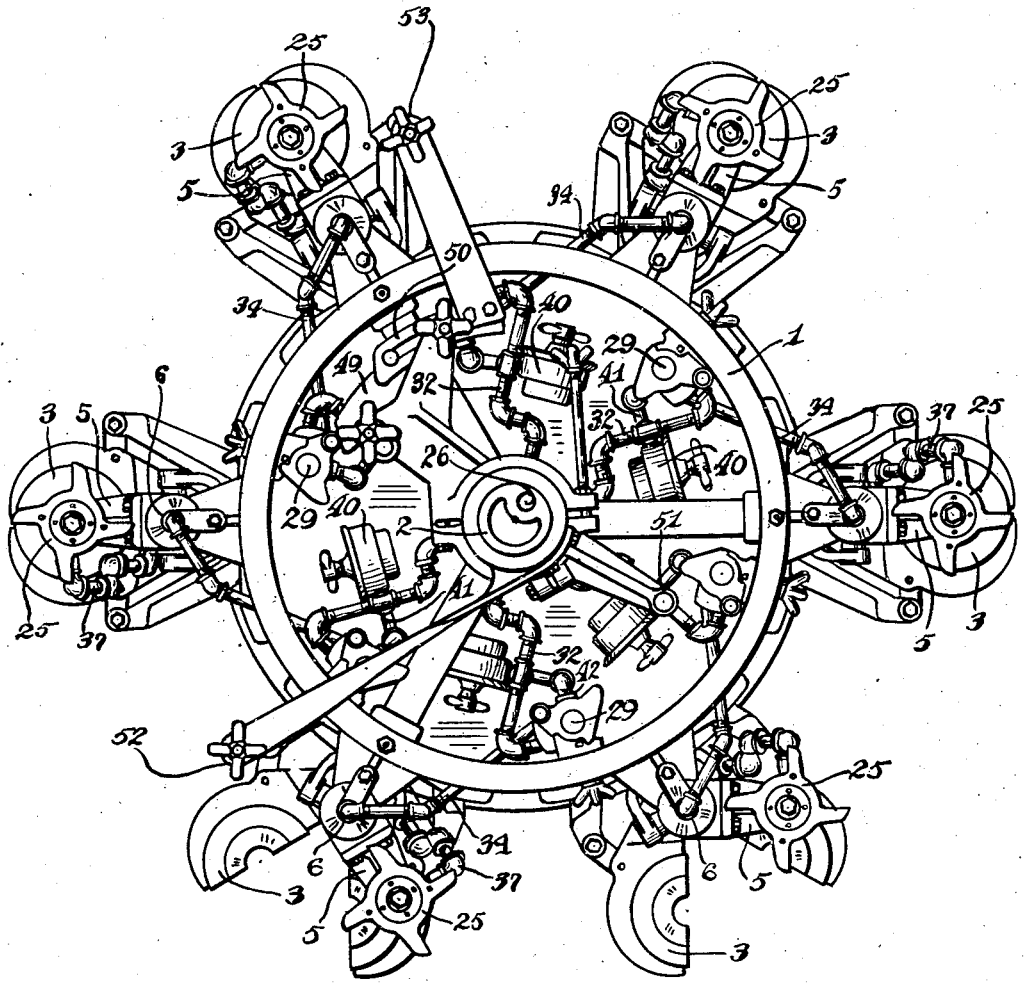

Figs. 6A, B, and C are diagrammatic views showing the relationship of the ports of the valve shown in Figs. 4 and 5 with the valve member during the operation of the apparatus; and Fig. 7 is a detailed view, showing the cam groove in the blow head support.

In the embodiment of the invention, the usual rotary frame 1 is provided. This frame is adapted to rotate on a hollow vertical standard 2 and the frame proper carries a plurality of molds 3 which, during their rotative movement, are adapted to be closed for the reception of the glass container rendered plastic by heat, and to have clamped down on the top thereof a blow head 4 and then adapted to be opened, after the blow head has been raised again for the purpose of delivering the shaped container. These parts are of the usual construction, and description thereof need not be elaborated herein.

Each of the blow heads 4 is mounted on a swingable arm 5 which arm not only oscillates but is raised vertically, and to this end the arm is mounted upon a king pin 6 suitably supported in the frame 1. The oscillating vertical spiral movement of the arm 5 is induced through the medium of suitable cam mechanism generally indicated as at 7 and by a cam pin 8 operating in a spiral groove 9 in the hub 10 of the arm. The vertical movement of the hub 10 on the king pin 6 is induced through a rocker arm 10' pivoted at 10'' to the frame and carrying a roller 10''' at its rear end cooperating with a cam 10$^{IV}$ on the frame.

The blow head 4 is vertically adjustable in its supporting arm 5 through a screw and nut arrangement 11 which permits vertical adjustment of the blow head for accommodating molds of various heights. This blow head 4, as illustrated in Fig. 3, is mounted on a threaded stem 12 which is hollow and through which the air delivery pipe 13 is adapted to pass and be projected somewhat below the bottom of the blow head proper.

The blow head 4 is provided with a neck receiving recess 14 adapted to fit down over the neck of the container supported in the mold and this recess has an angular groove 15 in the walls thereof covered by a liner 16. This liner is provided with suitable air ports 17 through which air admitted into the groove 15 will be directed upon the neck of the container for the purpose of cooling the same. The top of this neck receiving recess communicates through an opening 18 with the threaded stem 12 so that an air passage is provided through the stem 12 around the pipe 13. The upper end of the stem 12 is screw threaded into the bottom of a valve 19 and the air pipe 13 is secured at its upper end in a plug 20 threaded into the top of the valve 19. This plug has an annular groove 21 cooperating with an annular groove 22 in the valve to permit the passage of air thereinto and the air from these two grooves passes into the air pipe 13 through suitable openings 23 extending through the plug 20 as well as through the top of the air supply pipe 13. Admission of air to the air supply pipe is controlled by a rotary valve member 24 which has secured on the top thereof, a star 25.

For supplying blowing and cooling air to the blow head, we preferably form within the hollow standard 2 a conduit 26 which, at its upper end, is adapted to be connected, through a suitable hose, or other connection, with the compressed air supply under a relatively high pressure. This conduit, at its lower end, opens into an annular groove 27 formed around the periphery of the standard 2. This groove is covered by a hub 28 of the frame 1 surrounding the standard 2 and provided with suitable stuffing boxes. We are thus enabled to form, by the groove 27, a pressure box from which the air under pressure may be led through suitable connections to the plurality of molds and blow heads supported on the frame.

For supplying each of the blow heads carried on the frame with suitable air under pressure, we provide for each of the blow heads, a valve 29, the casing 30 of which is provided with an inlet port 31 connected by pipe 32, which, preferably, is a metal pipe, with the hub 28, and through the hub with the air box or groove 27. An outlet port 33 is placed in communication by suitable piping 34 with the top of the hollow king pin 6. The hollow portion of this king pin, in turn, communicates with a central bore 35 in the cam pin 8. This hollow bore communicates with the short longitudinal groove 36 in the hub 10 of the supporting arm 5. This groove 36 is in register with the bore in pin 8 when the hub and blow head are in lowered or blowing position. This groove 36 is, in turn, connected by a pipe connection 37 with an inlet port 38 leading to the annular groove 22 in the valve 19. Therefore, high pressure cooling air may be conducted from the high pressure source 26 through the conduit 32, the valve 29, and the valve 19 to the air pressure supply pipe 13 without the necessity of any flexible piping from the air supply to the blow head.

In addition to the cooling pressure which is admitted through the valve 19 as heretofore described, we also admit a blowing pressure through this valve at a considerably reduced pressure. To this end, a branch pipe connection 39 is taken from the pipe 32, which connection, passing through a pressure reducing valve 40, is connected by a pipe 41 with a low pressure inlet port 42 on the valve 29. Therefore, after the low pressure air has been admitted to the blow head for the purpose of shaping the container, cooling high pressure may be admitted to the head for the purpose of cooling the container before it is removed from the mold. Obviously, during the period in which the low pressure air is admitted to the mold for the purpose of shaping the container, this air should be held against escape from the container and mold in order to exert the proper air pressure for shaping the container. To this end, while there is an escape passage from the blow head, and therefore from the mold 3 by way of the passage 18 during the admission of low pressure air through the pipe 13, this passageway 18, which communicates with a port 43 and an escape port 44, is closed. This is due to the fact that the valve member 24 is rotated to a position wherein the port 43 is out of register with the escape port 44. As soon, however, as the low pressure air has been maintained in the mold for a sufficient length of time to shape the container, the valve 29 will be operated to shift to a position shutting off the low pressure air supply to the blow head and connecting the blow head with the high pressure air supply. At the same time that this shift from the low pressure air to the high pressure air takes place, the ports 43 and 44 will be thrown into register so that the air already in the container and the high pressure air admitted to the container or mold may escape to the atmosphere. We are thus enabled to, after the forming of the glass container in the mold through the medium of the low pressure air, flow a stream of high pressure cooling air into and through the mold thus blowing out the hot low pressure air and maintaining a flow of cooling high pressure air in the mold for the purpose of cooling the shaped container therein.

In order to understand more fully the operation of the valve 19, we have illustrated in Figs. 6A, B, and C, various positions of the valve for admitting blowing and cooling pressure to the blow head. It is to be noted that the valve member 45 is provided with an S-slot 46. In the blowing position, Fig. 6B, the bottom portion of the S-slot connects the blowing inlet port 42 with the blowing outlet port 33 of the valve casing. In the cooling position, the blowing inlet port 42 is out of register with the bottom leg of the S-slot while the cooling inlet port 31 is placed in register therewith (Fig. 6C). The slot, however, is in communication with the outlet 33 just the same so that, instead of the low blowing pressure being admitted to the mold, a high cooling pressure is admitted to the mold. Finally, after the parts have been moved to a delivery position Fig. 6A, the valve member 45 will have been moved to a position where the outlet 33 and the cooling inlet 31 are both out of register with the valve slot so that the air supply is entirely cut off.

For the purpose of moving or rotating the valve member 45 to low pressure inlet position, high pressure inlet position, and shut off position, the valve member is provided with a roller 47 and with a striker arm 48. The roller 47 is adapted to engage a stationarily mounted cam 49 which, during the rotation of the frame, will cause the valve member 45 to rotate to low pressure blowing position. After this position has been maintained for the desired length of time, the roller will strike a second cam 50, likewise stationarily mounted, which cam will rotate the valve member 45 still further and into the high pressure cooling position. This high pressure cooling position is maintained until the mold has approximately reached its delivery position wherein the striker arm 48 will strike a stationary roller 51 to rotate the valve member 45 to its closed position. In this position it will remain until it has rotated again to strike the cam 49.

Likewise, in order to close and open the escape port 44, the fingers of the star member 25 are adapted to initially strike a striker arm 52 mounted in the path thereof and stationarily supported, which striker arm will rotate the valve casing to move the ports 43 and 44 out of register so that, when the low pressure air is admitted to the blow head, it will not escape from these ports. As soon, however, as the valve mold has passed the blowing position, that is, the position wherein it is desired to release the blowing pressure, the fingers of the star member 25 will strike a second striker arm 53 which will rotate the valve to an open position with the ports 43 and 44 in register, thus permitting the escape of not only the blowing pressure air but also of the cooling air during the further rotary movement of the blowing mold.

In addition to the cooling pressure which is admitted through the tube 13 as heretofore described, we admit also a cooling pressure to the neck receiving socket 14 from the pipe 54 which is connected by a suitable T coupling 55 with the inlet pipe 37.

Furthermore, in order to accommodate the vertical adjustment of the valve head, we provide in this pipe 37 a rotatable joint 58.

In order to control the flow through the escape ports 43 and 44, we provide a screw plug 59 through the medium of which the size of the escape opening providing a communication between the air passage in the threaded stem 12 and the port 43, is adjusted. By adjusting the flow of air in this manner the cooling air flow through the valve molds and the containers formed therein may be controlled.

In order to hold the king pin 6 and its associated parts against rotation and furthermore in order to provide for a slight rotative adjustment of this king pin, we secure to the top of the king pin, preferably by welding, an arm 60 having a suitable opening therein through which the pipe 39 may pass, which arm, at its opposite end, is provided with an elongated slot through which passes a clamping bolt. By fastening the clamping bolt tight, rotation of the arm is prevented and, at the same time, by slightly loosening the bolt a slight adjustment of the king pin 6 may be obtained.

It is to be noted that each of the blow heads is provided with an independent connection with a source of air pressure. Therefore, the air flow through each blow head may be independently controlled, thus making the blow head an independent unit with its air supply controllable independently of the air supply of the other blow heads. This provides for a nice adjustment of the air flow dependent upon the characteristic of each mold which is rather important in view of the fact that the molds, while being substantially all the same, may have slight variations in dimensions, etc.

It is to be understood that where we refer to air pressure, we contemplate any suitable fluid pressure for accomplishing the purposes desired.

We claim as our invention:

1. A rotary supporting frame, a supporting king pin supported on said frame and having a central bore, a cam pin mounted on said king pin extending transversely thereof and having a bore communicating with said king pin bore, said cam pin bore extending to the periphery of said cam pin, a hub vertically movable on said king pin and having a spiral slot therein engaged by said cam pin for imparting an oscillating movement to said hub, means associated with said frame and hub and adapted by the rotation of said frame to vertically reciprocate said hub, said hub having an internal groove therein adapted to coincide with said cam pin bore when the hub is in a predetermined position, a blow head carried by said hub, conduit means for connecting said blow head with said hub groove and conduit means for connecting said king pin bore with a source of fluid under pressure.

2. In an apparatus for forming hollow glass containers, in combination, a stationary source of fluid under pressure, a rotatable frame, a king pin supported on said frame relatively vertically stationary thereon and having a hollow bore, conduit means rotating with said frame connecting said bore with said fluid pressure source, a hub mounted on and carried by said king pin and vertically and oscillatingly movable on and relatively to said king pin and having a fluid pressure recess, means associated with said frame and hub and adapted by the rotation of said frame to vertically and oscillatingly move said hub, conduit means extending between said recess and said king pin bore, a blow head adjustably carried by said hub, means for adjustably positioning said blow head on said hub and a flexible conduit rotatable with said hub and blow head for connecting said blow head with said recess and permitting relative movement between said blow head and hub.

3. In an apparatus for forming hollow glass containers, in combination, a stationary source of fluid under pressure, a rotatable frame, a king pin supported on said frame vertically stationary relatively to said frame, and having a hollow bore, a valve controlling the admission of fluid under pressure to said king pin bore and mounted on said frame, conduit means extending between said valve and king pin bore, conduit means extending between said valve and said source of fluid pressure supply, a hub mounted on and carried by said king pin, vertically movable on and relatively to said king pin and having a fluid pressure recess, means associated with said frame and hub and adapted by the rotary movement of said frame to vertically move said hub on said king pin, means for connecting said recess with said king pin bore, a blow head adjustably carried by said hub, means for adjustably positioning said blow head on said hub and a flexible conduit rotatable with said hub and blow head on said frame for connecting said blow head with said recess and permitting relative movement between said blow head and hub.

4. In an apparatus for forming hollow glass containers, in combination, a rotatable frame, a king pin mounted on said frame and vertically stationary thereon, a conduit stationary relatively to said frame, said king pin having a hollow bore connected to said conduit, a hub mounted on and carried by said king pin oscillatingly and vertically movable on and relatively to said king pin having a fluid pressure recess, means associated with said frame and hub and adapted by the rotary movement of said frame to oscillatingly and vertically move said hub, a fluid pressure connection between said recess and said king pin bore, a blow head supported by said hub and a conduit extending between said blow head and said recess and exteriorly of said blow head and hub.

5. In an apparatus for forming hollow glass containers, in combination, a rotary supporting frame, a source of fluid under relatively high pressure, pressure reducing means carried by said frame, a pressure conduit extending between said pressure reducing means and said source of fluid under relatively high pressure, a blow head supported on said frame, a valve carried by said frame, conduit connections between said valve and said pressure reducing means and between said valve and said high pressure source, said valve controlling the admission of fluid under high and low pressure to said blow head, conduit connections between said valve and said blow head, a valve carried on said blow head, and means operatively associated with said blow head valve and controlling the egress of fluid under pressure from said blow head.

6. In an apparatus for forming hollow glass containers, in combination, a rotary supporting frame, a supporting king pin carried on said frame, vertically stationary relatively thereon and having a central bore, a hub vertically and rotatably movable on said king pin, means associated with said frame and hub adapted by the rotary movement of said frame to vertically move the hub and rotate the same on the king pin, said hub having a fluid pressure recess, means for connecting said recess with said king pin bore, a blow head supported on said hub, sources of fluid under relatively high and relatively low pressure, a valve carried on said frame and controlling the flow of fluid under pressure to said king pin bore from said sources of relatively high and relatively low pressures, a conduit connecting said recess with said blow head, and a secondary valve on said blow head controlling the egress of fluid under pressure from said blow head.

7. In an apparatus for forming hollow glass containers, in combination, a rotatable frame, a plurality of blow heads carried by said frame, a fluid pressure supply conduit associated with said frame relatively stationary with respect to said frame and adapted to supply a fluid under relatively high pressure, a control valve for each of said blow heads, a pressure reducing means for each of said blow heads, means associated with said frame for connecting each of said reducing means with said supply conduit, means associated with said frame for connecting each of said control valves with its associated pressure reducing mean, means for connecting each of said control valves with said fluid pressure supply conduit, means connecting each of said blow heads with its associated control valve and means for operating each of said control valves by the rotation of said frame to initially connect its associated blow head with the fluid pressure supply conduit supplying fluid under relatively high pressure through said reducing means and then directly with said fluid pressure supply conduit supplying fluid under relatively high pressure.

8. In an apparatus for forming hollow glass containers, in combination, a rotatable frame, a plurality of king pins supported on said frame, each of said king pins having a hollow bore, a blow head supported on each of said king pins, means associated with said frame for vertically and oscillatingly moving said blow heads on said king pins, means for connecting the hollow bore of each of said king pins with its supported blow head, a supply conduit associated with said frame, stationary relatively thereto and adapted to supply fluid under relatively high pressure, a control valve associated with each of said king pins, a fluid pressure reducing means associated with each of said king pins, conduit means for said pressure reducing means connected with said relatively stationary conduit, means for connecting the hollow bore of each king pin with its associated control valve, means for connecting each control valve with its pressure reducing means, means for connecting said control valves directly with said supply conduit supplying fluid under relatively high pressure and means for operating each of said control valves by the rotation of said frame to initially connect its associated king pin bore with said conduit supplying fluid under relatively high pressure through said reducing means and then directly with said conduit supplying fluid under relatively high pressure.

OTTO H. SAMUELSON.
ANTHONY T. ZAPPIA.